(12) United States Patent
Papamanthou et al.

(10) Patent No.: US 12,400,019 B1
(45) Date of Patent: Aug. 26, 2025

(54) SYSTEMS AND METHODS FOR CRYPTOGRAPHICALLY VERIFYING QUERIES

(71) Applicant: Lagrange Labs Inc., New York, NY (US)

(72) Inventors: Charalampos Papamanthou, Fairfield, CT (US); Shravan Srinivasan, Gaithersburg, MD (US); Joshua Fitzgerald, Fort Wayne, IN (US); Nathaniel Bunner, Carrboro, NC (US); Andrus Salumets, Amsterdam (NL); Nicolas Gailly, Paris (FR); Ismael Hishon-Rezaizadeh, New York, NY (US)

(73) Assignee: LAGRANGE LABS INC., New York, NY (US)

( * ) Notice: Subject to any disclaimer, the term of this patent is extended or adjusted under 35 U.S.C. 154(b) by 0 days.

(21) Appl. No.: 18/927,514

(22) Filed: Oct. 25, 2024

Related U.S. Application Data

(63) Continuation of application No. PCT/US2024/050368, filed on Oct. 8, 2024.

(30) Foreign Application Priority Data

Sep. 9, 2024 (GR) .............................. 20240100620

(51) Int. Cl.
G06F 21/62 (2013.01)
G06F 16/28 (2019.01)
G06F 21/60 (2013.01)

(52) U.S. Cl.
CPC ........ G06F 21/6227 (2013.01); G06F 16/284 (2019.01); G06F 21/602 (2013.01)

(58) Field of Classification Search
CPC ... G06F 21/6227; G06F 16/284; G06F 21/602
See application file for complete search history.

(56) References Cited

U.S. PATENT DOCUMENTS 9,049,185 B1 * 6/2015 Papadopoulos ....... H04L 63/123
11,829,486 B1 11/2023 Lambotte
(Continued)

FOREIGN PATENT DOCUMENTS

WO WO-2023072955 A1 5/2023

OTHER PUBLICATIONS

Xiling Li et al., "ZKSQL: Verifiable and Efficient Query Evaluation with Zero-Knowledge Proofs", PVLDB, 16(8): 1804-1816, Apr. 1, 2023 (Year: 2023).*

(Continued)

*Primary Examiner* — Jung W Kim
*Assistant Examiner* — Alan L Kong
(74) *Attorney, Agent, or Firm* — WILSON SONSINI GOODRICH & ROSATI

(57) ABSTRACT

Methods and systems are provided for cryptographically verifying SQL queries. The method comprises: computing a succinct digest for a table stored in a database; receiving a query in structured query language (SQL) for querying data in the table; decomposing the query into one or more basic queries; computing one proof per basic query in parallel and in a distributed fashion; and verifying the query by verifying the previously computed proofs in parallel, and checking for consistency of their public statements, according to the previously executed query decomposition.

40 Claims, 10 Drawing Sheets

(56) References Cited

U.S. PATENT DOCUMENTS

2011/0225429 A1* 9/2011 Papamanthou ..... G06F 16/2246
713/189
2024/0154812 A1 5/2024 Sun et al.

OTHER PUBLICATIONS

Howard Wu et al., "DIZK: A Distributed Zero Knowledge Proof System", 27th USENIX Security Symposium: 675-692, Aug. 2018 (Year: 2018).*

Zerui Cheng et al., "zkBridge: Trustless Cross-chain Bridges Made Practical", Proceedings of the 2022 ACM SIGSAC Conference on Computer and Communications Security: 3003-3017, Nov. 2022 (Year: 2022).*

Sanjam Garg et al., "zkSaaS: Zero-Knowledge SNARKs as a Service", 32nd USENIX Security Symposium: 4427-4444, Aug. 2023 (Year: 2023).*

Howard Wu et al., "DIZK: A Distributed Zero Knowlegde Proof System", 27th USENIX Security Symposium: 675-692, Aug. 2018 (Year: 2018).*

Xiling Li et al., "ZKSQL: Verifiable and Efficient Query Evaluation with Zero-Knowlegde Proofs", PVLDB, 16(8): 1804-1816, Apr. 1, 2023 (Year: 2023).*

Yupeng Zhang et al., "vSQL: Verifying Arbitrary SQL Queries over Dynamic Outsourced Databases", 2017 IEEE Symposium on Security and Privacy (SP) (Year: 2017).*

Clarke, Dwaine et al. Incremental multiset hash functions and their application to memory integrity checking. In: Advances in Cryptology—ASIACRYPT. Springer 2894:188-207 (2003).

Co-pending U.S. Appl. No. 18/661,204, inventors Papamanthou; Charalampos et al., filed May 10, 2024.

Groth, Jens. On the size of pairing-based non-interactive arguments. In: Advances in Cryptology—EUROCRYPT. Springer 9666:305-326 (2016).

Li, Xiling et al. Zksql: Verifiable and efficient query evaluation with zero-knowledge proofs. Proceedings of the VLDB Endowment 16(8):1804-1816 (2023).

Merkle, Ralph C. et al. Certified Digital Signature. In Advances in Cryptology—CRYPTO '89. Springer 435:218-238 (1989).

Papamanthou, Charalampos et al. Reckle Trees: Updatable Merkle Batch Proofs with Applications. Cryptology ePrint Archive:1-14 (2024).

Plonky2: Fast Recursive Arguments with PLONK and FRI. GitHub, Sep. 7, 2022. Available at URL:https://github.com/0xPolygonZero/plonky2/blob/main/plonky2/plonky2.pdf pp. 1-16.

Tamassia, Roberto. Authenticated data structures. Algorithms—ESA 2003: 11th Annual European Symposium. Springer 2832:2-5 (2003).

Yang, Yin et al. Authenticated join processing in outsourced databases. Proceedings of the 2009 ACM SIGMOD International Conference on Management of data. ACM:5-18 (2009).

Zhang, Yupeng et al. IntegriDB: Verifiable SQL for outsourced databases. Proceedings of the 22nd ACM SIGSAC Conference on Computer and Communications Security. ACM:1480-1491 (2015).

Zhang, Yupeng et al. vSQL: Verifying arbitrary SQL queries over dynamic outsourced databases. 2017 IEEE Symposium on Security and Privacy (SP). IEEE:863-880 (2017).

PCT/US2024/050368 International Search Report and Written Opinion dated Dec. 30, 2024.

* cited by examiner

Table 1: Perseus's verifiable SQL operators.

| Public Statement | Meaning |
|---|---|
| $\text{CREATE}_x(d, o, T)$ | $d$ is digest of table $T$ sorted by attribute $x$ |
| $\text{SELECT}_x(d, o, \text{pred})$ | $o$ is digest of a subset of rows of a table with digest $d$—rows selected by applying $\text{pred}$ on $d$'s attribute $x$ |
| $\text{SORT}_x(d, d')$ | $d'$ is digest of a table with digest $d$, but sorted on attribute $x$ |
| $\text{AGNOSTIC-SORT}_x(o, d')$ | same with $\text{SORT}_x(d, d')$, except that input digest $o$ is an order-agnostic one |
| $\text{PROJECT-SORT}_x(o, d')$ | same with $\text{SORT}_x(d, d')$ except that output only includes attribute $x$ |
| $\text{RANGE}_x(d, o, l, r)$ | $o$ is digest of a subset of rows of a table with digest $d$—rows selected such that $d$'s attribute $x$ is in $[l, r]$ |
| $\text{JOIN-RANGE}_x(d, o, l, r, oul)$ | same with $\text{RANGE}_x(d, o, l, r)$, except that every row in output digest $o$ is concatenated with $oul$ |
| $\text{EQUIJOIN}_x(d, d', o)$ | $o$ is digest of all pairs of rows of tables with digests $d$ and $d'$ such that selected pairs have matching attributes $x$ |
| $\text{GROUPBYAGG}_{x,y}(d, o, \text{agg})$ | $o$ is digest of table derived from table with digest $d$ by compressing duplicates on $x$ while applying $\text{agg}$ on $y$ |
| $\text{PROJECT}_x(d, o)$ | $o$ is digest of a table produced by a table with digest $d$ by keeping only the columns of attribute(s) $x$ |
| $\text{ADD}_x(d, d')$ | $d'$ is digest of a table produced from a table with digest $d$ by adding a new attribute $x$ initialized with a default value |
| $\text{LIFT}(o, d)$ | $d$ is the Merkle digest of a table whose order-agnostic digest is $o$ |

FIG. 2

$$C_v = \text{Hash}(C_L, C_R) = \begin{cases} M[i] & o \text{ is a leaf node at index } i \\ o & o \text{ is an external node} \\ H(C_L || C_R) & L \text{ is } o\text{'s left child and } R \text{ is } o\text{'s right child and both } R \text{ and } L \text{ are not external} \\ C_L & L \text{ is } o\text{'s left child and } R \text{ is external} \\ C_R & L \text{ is } o\text{'s left child and } R \text{ is external} \end{cases}$$

*FIG. 3*

$$d(v, I) = \text{CanonicalHash}(d(L, I), d(R, I)) = \begin{cases} c_v & v \text{ is a leaf node that belongs to some subset } I \\ o & v \text{ is a leaf node that does not belong to set } I \text{ or } v \text{ is an external node} \\ H(d(L, I) || d(R, I)) & L \text{ is } v\text{'s left child and } R \text{ is } v\text{'s right child and } d(L, I) \cdot d(R, I) \neq 0 \\ o & L \text{ is } v\text{'s left child and } R \text{ is } v\text{'s right child and } d(L, I) = 0 \text{ and } d(R, I) = 0 \\ d(L, I) & L \text{ is } v\text{'s left child and } d(L, I) \neq 0 \text{ and } d(R, I) = 0 \\ d(R, I) & L \text{ is } v\text{'s right child and } d(L, I) \neq 0 \text{ and } d(R, I) = 0 \end{cases}$$

FIG. 4

Circuit $\mathcal{M}_0$

Public input: $(C, d, o, out)$
Witness: $(C_L, d_L, o_L, out_L)$ and $(C_R, d_R, o_R, out_R)$
Computation:
(1) Check $C = \text{Hash}(C_L, C_R)$;
(2) Check $(d, o) = \text{CanonicalHash}((d_L, o_L), (d_R, o_R))$;
(3) Check $\text{Reduce}(out_L, out_R, out)$;
(4) If $d_L \neq 0$ check $\text{Map}(C_L, out_L)$ and $d_L = C_L$;
(5) If $d_R \neq 0$ check $\text{Map}(C_R, out_R)$ and $d_R = C_R$;
(6) Return true;

Circuit $\mathcal{M}_i$, $i = 1, \ldots, \ell - 1$

Public input: $(C, d, o, out)$
Witness: $(C_L, d_L, o_L, out_L, \pi_L)$ and $(C_R, d_R, o_R, out_R, \pi_R)$
Computation:
(1) Check $C = \text{Hash}(C_L, C_R)$;
(2) Check $(d, o) = \text{CanonicalHash}((d_L, o_L), (d_R, o_R))$;
(3) Check $\text{Reduce}(out_L, out_R, out)$;
(4) If $d_L \neq 0$ check $\text{Verify}(vk_{i-1}, (C_L, d_L, o_L, out_L), \pi_L)$;
(5) If $d_R \neq 0$ check $\text{Verify}(vk_{i-1}, (C_R, d_R, o_R, out_R), \pi_R)$;
(6) Return true;

FIG. 5

```
select
    o_orderpriority,
    count(*) as order_count
from
    orders
where
    o_orderdate >= date '[DATE]'
    and o_orderdate < date '[DATE]' + interval '3' month
    and exists (
        select
            *
        from
            lineitem
        where
            l_orderkey = o_orderkey
            and l_commitdate < l_receiptdate
    )
group by
    o_orderpriority
order by
    o_orderpriority;
```

FIG. 8

```
select
    n_name,
    sum(l_extendedprice * (1 - l_discount)) as revenue
from
    customer,
    orders,
    lineitem,
    supplier,
    nation,
    region
where
    c_custkey = o_custkey
    and l_orderkey = o_orderkey
    and l_suppkey = s_suppkey
    and c_nationkey = s_nationkey
    and s_nationkey = n_nationkey
    and n_regionkey = r_regionkey
    and r_name = '[REGION]'
    and o_orderdate >= date '[DATE]'
    and o_orderdate < date '[DATE]' + interval '1' year
group by
    n_name
order by
    revenue desc;
```

*FIG. 9*

```
select
    l_orderkey,
    sum(l_extendedprice * (1 - l_discount)) as revenue,
    o_orderdate,
    o_shippriority
from
    customer,
    orders,
    lineitem
where
    c_mktsegment = '[SEGMENT]'
    and c_custkey = o_custkey
    and l_orderkey = o_orderkey
    and o_orderdate < date '[DATE]'
    and l_shipdate > date '[DATE]'
group by
    l_orderkey,
    o_orderdate,
    o_shippriority
order by
    revenue desc,
    o_orderdate;
```

FIG. 10

SYSTEMS AND METHODS FOR CRYPTOGRAPHICALLY VERIFYING QUERIES

CROSS-REFERENCE

This application is the by-pass continuation of International Application No. PCT/US2024/050368, filed Oct. 28, 2024, which claims the benefit of Greek patent application No. 20240100620 filed Sep. 9, 2024, each of which are incorporated herein by reference in their entirety for all purposes.

BACKGROUND

Smart contracts often times need to perform computation on-chain, for example, in order to compute the total amount of an asset owned by a specific address, or to compute the average price of a token during a certain period of time. Such computations share one common feature: They do not have access to the data directly—instead, the contracts have access to a commitment/digest d—of the data, exposed through a type of Merkle tree called Merkle Patricia Tries (MPTs). However, decommitting (i.e., recomputing the commitment) as well as performing the computation on-chain is particularly expensive.

In the field of verifying queries, simple data structure queries (e.g., membership and non-membership) can be verified against digests of data structures. The database community considered the notion of verifiable JOINS, but the proof sizes can become large. Small proof sizes were achieved for a very small subset of SQL with IntegriDB. A more complete set of SQL queries were considered in vSQ. Finally, recently ZKSQL was proposed as a system for zero-knowledge SQL. However, ZKSQL is in a different model where there is interaction between the prover and the verifier.

SUMMARY

The present disclosure addresses the above needs by providing a system that outputs SNARK proofs for arbitrary SQL queries on Merkle-type commitments of relational tables with reduced proof size. The system may implement architectures such as zk-rollups, where smart contracts verify computational proofs of correctness (e.g., recursive succinct non-interactive arguments of knowledge (SNARK) proofs) for the desired computation on the commitment/digest d. The SNARK proof can be computed off-chain, significantly alleviating the gas cost required by smart contracts which will only have to read the public statement (i.e., Merkle Patricia commitment/digest d) and verify the respective SNARK proof $\pi$.

Systems herein may implement the architectures in full generality: SQL language is the computation and relational tables are the "state" or "data." The present disclosure builds a system (referred to as PERSEUS) that outputs SNARK proofs for arbitrary SQL queries on Merkle-type commitments of relational tables.

In an aspect, a computer-implemented method is provided for cryptographically verifying SQL queries. The method comprises: computing a succinct digest for a table stored in a database: receiving a query in structured query language (SQL) for querying data in the table; decomposing the query into one or more basic queries; and computing one proof per basic query in parallel and in a distributed fashion; and verifying the query by verifying the previously computed proofs in parallel, and checking for consistency of their public statements, according to the previously executed query decomposition.

In a related yet separate aspect, a computer-implemented system is provided. The system comprises at least one processor and instructions executable by the at least one processor to cause the at least one processor to perform a method for cryptographically verifying SQL queries by performing operations comprising: computing a succinct digest for a table stored in a database: receiving a query in structured query language (SQL) for querying data in the table; decomposing the query into one or more basic queries; and computing one proof per basic query in parallel and in a distributed fashion; and verifying the query by verifying the previously computed proofs in parallel, and checking for consistency of their public statements, according to the previously executed query decomposition.

In a related yet separate aspect, one or more non-transitory computer-readable storage media encoded with instructions executable by one or more processors is provided. The instructions are executable by the one or more processors to provide an application for cryptographically verifying SQL queries. The application comprises a software module computing (or configured to compute) a succinct digest for a table stored in a database: a software module receiving (or configured to receive) a query in structured query language (SQL) for querying data in the table; a software module decomposing (or configured to decompose) the query into one or more basic queries; a software module computing (or configured to compute), in parallel and in a distributed fashion, one proof per basic query; and a software module verifying (or configured to verify) the query by performing at least: verifying the previously computed proofs in parallel, and checking for consistency of public statements, according to the previously executed query decomposition.

In some embodiments, the succinct digest of the table is collision resistant representation of the table. In some cases, the succinct digest of the table is computed using a Merkle tree. In some cases, the succinct digest of the table is computed using an order-agnostic hash function.

In some embodiments, the table is a relational table and the database is a relational database. In some embodiments, each of the one or more basic queries comprises a verifiable SQL operator from a library of verifiable SQL operators. In some cases, a verifiable SQL operator is a SNARK proof for a statement involving a succinct digest of a table. In some instances, verifying the query comprises verifying, for each basic query, an input and output to the statement is consistent.

In some embodiments, a size of a proof for verifying the query is dependent on a number of the one or more basic queries. In some embodiments, a size of a proof for verifying the query is not dependent on a size of the table. In some embodiments, computing and verifying the one or more proofs for the one or more basic queries comprise using Map/Reduce circuits for Reckle trees.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the present disclosure are set forth with particularity in the appended claims. A better understanding of the features and advantages of the present disclosure will be obtained by reference to the following detailed description that sets forth illustrative embodiments, and the accompanying drawings (also "Figure" and "FIG." herein), of which:

FIG. 2 shows an example of a library of verifiable operators (or gadgets) as shown in Table 1.

FIG. 3 shows an example of computing hash $C_v$ as a function of $C_L$ and $C_R$ in the general case when the number of leaves is not a power of two.

FIG. 4 shows an example of computing hash $C_v$ as a function of of $C_L$ and $C_R$ in the general case when the number of leaves is not a power of two.

FIG. 5 shows an example of Map/Reduce circuits for Reckle trees, with vki indicating the verification key for circuit $M_i$.

FIG. 8 shows query Q4 from the TPC-H benchmark.

FIG. 9 shows query Q5 from the TPC-H benchmark.

FIG. 10 shows query Q3 from the TPC-H benchmark.

DETAILED DESCRIPTION

Figure 1:
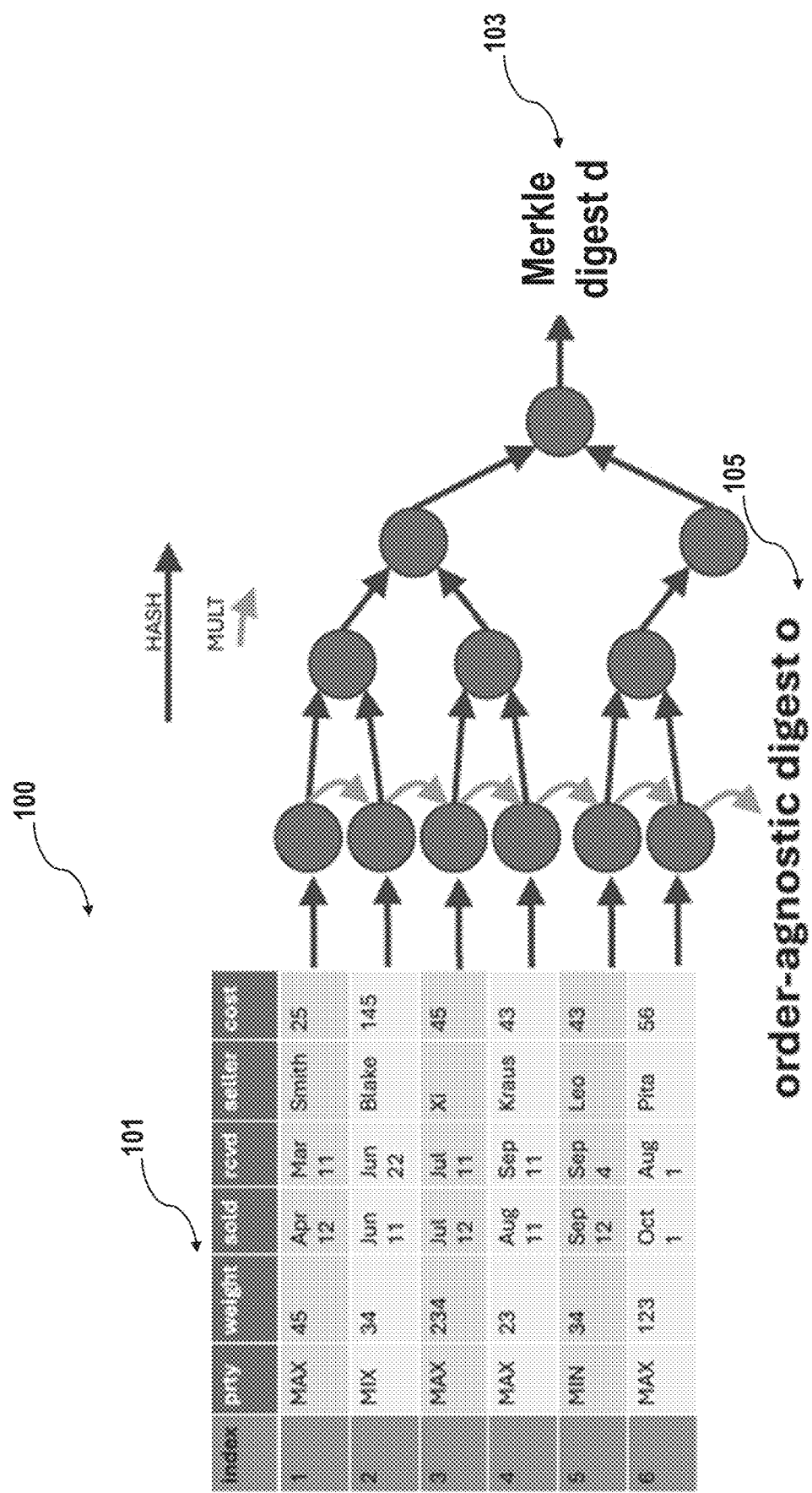
FIG. 1 shows an example of Merkle digest and order-agnostic digest of a table.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Certain Definitions

Unless otherwise defined, all technical terms used herein have the same meaning as commonly understood by one of ordinary skills in the art to which this invention belongs.

Reference throughout this specification to "some embodiments," or "an embodiment," means that a particular feature, structure, or characteristic described in connection with the embodiment is included in at least one embodiment. Thus, the appearances of the phrase "in some embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," "unit," "module" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In some cases, a component can emulate an electronic component via a virtual machine, e.g., within a cloud computing system.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

As used herein a processor encompasses one or more processors, for example a single processor, or a plurality of processors of a distributed processing system for example. A controller or processor as described herein generally comprises a tangible medium to store instructions to implement steps of a process, and the processor may comprise one or more of a central processing unit, programmable array logic, gate array logic, or a field programmable gate array, for example. In some cases, the one or more processors may be a programmable processor (e.g., a central processing unit (CPU) or a microcontroller), digital signal processors (DSPs), a field programmable gate array (FPGA) and/or one or more Advanced RISC Machine (ARM) processors. In some cases, the one or more processors may be operatively coupled to a non-transitory computer readable medium. The non-transitory computer readable medium can store logic, code, and/or program instructions executable by the one or more processors unit for performing one or more steps. The non-transitory computer readable medium can include one or more memory units (e.g., removable media or external storage such as an SD card or random access memory (RAM)). One or more methods or operations disclosed herein can be implemented in hardware components or combinations of hardware and software such as, for example, ASICs, special purpose computers, or general purpose computers.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As mentioned above, simple data structure queries (e.g., membership and non-membership) could be verified against digests of data structures. The database community considered the notion of verifiable JOINS, but the proof sizes can become large. Small proof sizes were achieved for a very small subset of SQL with IntegriDB or there is interaction required between the prover and the verifier.

The present disclosure provides a system (Perseus) for cryptographically verifying a query in structured query language (SQL) (i.e., SQL query). In the system herein, relational tables are represented with succinct digests, computed either with a Merkle tree or with an order-agnostic hash function. All SQL queries may be decomposed into a series of basic SQL operators from a well-defined set of SQL operators (e.g., 10-20 SQL operators), such as RANGE or SORT, for which the system provides custom MAP/REDUCE protocols based on recursive SNARKs. To compute a proof for an SQL query, the prover can compute proofs for the involved SQL operators in a distributed fashion (both across operators and within each operator), leading to prover time that is sublinear in the size of the tables involved-similarly the produced proofs are also sublinear in size. In addition, the system allows proofs to be efficiently updated and without running the prover from scratch, whenever the underlying tables change. The preliminary experimental estimates on the well-known TPC-H benchmark used by the database community show that the system outperforms the baseline by 139× and 6.11× on proof size and updates, respectively.

Digests of relational tables. The data object in the system may comprise a digest, a collision-resistant representation of a relational table T. Digests are part of the public statement that the contract reads and may never have to be decommitted on-chain. The system may comprise two types of digests: A Merkle digest is computed using a standard Merkle tree and introduces structure—a Merkle digest is denoted with d, and an order-agnostic digest, denoted o, is computed with an order-agnostic hash function, such as MULTHASH. In some cases, a particular type of digest is selected from the different types of digests based on the data in the relational table. For example, it may be more practical to run certain SQL queries on ordered data (such as ranges) whereas sometimes it is more convenient to accumulate the result of an SQL query as digest of an unordered array and potentially "lift" it later to a Merkle digest with structure. In some cases, the different types of digests may be associated with certain metadata, such as the attribute names of the underlying table as well as whether the table is indexed, and if so, on which attribute.

FIG. 1 shows an example 100 of Merkle digest 103 and order-agnostic digest 105 of a table 101. For the Merkle digest 103 of the table of 6 rows, since 6 is not a power of two, a subtree of the full binary tree of 8 leaves is used. The six rows are always placed as leaves (not internal nodes) of the 8-leaf Merkle tree. For the order-agnostic digest 105, it may not include the "index" column.

Verifiable SQL operators. Given an SQL query q that is to verify on a set of relational tables represented by either Merkle or order-agnostic digests, the system decomposes q into a series of SQL operators, drawn from a library of SQL verifiable operators that it defines and constructs herein. A verifiable SQL operator may be considered as a SNARK proof for a well-defined public statement that involves table digests. FIG. 2 shows an example of a library of verifiable operators (or gadgets) as shown in Table 1 200. For example, a verifiable SQL operator is a SNARK proof for the public statement $RANGE_x$ (d, o, l, r), meaning that o is the order-agnostic digest of those rows of a table with Merkle digest d whose x attribute fall within the range [l, r]. To verify an SQL query, the prover may need to verify all involved SQL operators, making sure inputs and outputs to their public statements are consistent. This beneficially improves the verification efficiency as the total size of the proof for a specific SQL query is dependent only on the number of SQL operators used, but not on the size of the tables involved. In some cases, the system may further compress the final proof by using an additional level of recursion.

Constructing verifiable SQL operators. In some embodiments, verifiable SQL operators may be constructed using any SNARK: decommit the digest d within the circuit, and then express the SQL query as, for example, a R1CS set of constraints. However, there are two problems with such an approach. First, it is difficult to know ahead of time what the sizes of the involved tables are going to be—these depend on the nature of the query, the parameters of the query and the tables themselves. Second, using such an approach does not allow for natural parallelism of the prover—the prover can be parallelized only to the extent that the underlying SNARK can be parallelized. To address the problems, systems and methods herein may use Reckle trees, a framework that allows one to produce up-datable proofs for MAP-REDUCE computations on data committed to by a Merkle tree in a massively parallel fashion and by combining, via recursive SNARKs, a series of constant-size circuits. The proofs are updatable that whenever an entry of the SQL table changes, the proofs can be updated in logarithmic time, without having to run the prover from scratch. For example, every operator of the library (e.g., Table 1 of FIG.

2) can be expressed as a MAP-REDUCE computation and then provide an implementation using the Reckle trees framework. In addition, Reckle trees are extended to handle Merkle trees of arbitrary size, not just powers of two (see FIG. 1), which beneficially allows for a practical implementation. Details about the Reckle tree framework and Map/Reduce proofs with RECKLE+ TREES can be the same as those described in patent application Ser. No. 18/661,204 filed on May 10, 2024 which is entirely incorporated herein by reference. For example, the Map/Reduce proofs with RECKLE+ TREES are described as below.

Map/Reduce proofs with RECKLE+ TREES. Merkle trees may not support updatable verifiable computation over Merkle leaves. Merkle trees can only be used to prove memory content, but no computation over it. However, in certain applications (e.g., smart contract), it is desirable to compute an updatable proof for some arbitrary computation over the Merkle leaves, e.g., counting the number of Merkle leaves o satisfying an arbitrary function f(v)=1. For example, smart contracts can benefit by accessing historic chain MPT data to compute useful functions such as price volatility or BLS aggregate keys. Instead, such applications are currently enabled by the use of blockchain "oracles" that have to be blindly trusted to expose the correct output to the smart contract. In some embodiments, the present disclosure provides RECKLE+ TREES, an extension of RECKLE+ TREES that support updatable verifiable computation over Merkle leaves. With RECKLE+ TREES, a prover can commit to a memory M, and provide a proof of correctness for Map/Reduce computation on any subset of M.

In some embodiments, the RECKLE+ TREES may be technically achieved by encoding, in the recursive circuit, not only the computation of the canonical bash and the Merkle hash (as in the case of batch proofs), but also the logic of the Map and the Reduce functions. The final Map/Reduce proof can be easily updated whenever the subset changes, without having to recompute it from scratch.

In some cases, the methods herein may comprise embedding a computation of the batch hash inside the recursive Merkle verification via a hash-based accumulator (i.e., canonical hashing). The unique embedding beneficially allows for batch proofs being updated in logarithmic time, whenever a Merkle leaf (belonging to the batch or not) changes, by maintaining a data structure that stores previously-computed recursive proofs. In the cases of parallel computation, the batch proofs are also computable in O(log n) parallel time-independent of the size of the batch.

In alternative embodiments, an extension of Reckle trees or Reckle+ trees are provided. Reckle+ trees provide updatable and succinct proofs for certain types of Map/Reduce computations. For instance, a prover can commit to a memory M and produce a succinct proof for a Map/Reduce computation over a subset of M. The proof can be efficiently updated whenever or M changes.

Whether succinct Merkle batch proofs can be built that are efficiently updatable relates to the notion of updatable SNARKs, that are disclosed herein. An updatable SNARK is a SNARK that is equipped with an additional algorithm π'←Update ((x, w), (x', w'), π). Where the update function takes as input a true public statement x along with its witness w (prover's knowledge) and its verifying proof π as well as an updated true public statement x' along with the updated witness w'. It outputs a verifying proof π' for x' without running the prover algorithm from scratch and ideally in time proportional to the distance (for some definition of distance) of (x, w) and (x', w').

Reckle Trees

In some embodiments of the present disclosure, a Reckle tree is provided. The Reckle tree may be a unique vector commitment scheme that supports updatable and succinct batch proofs using RECursive SNARKs and MerKLE trees. The term "vector commitment" as utilized herein generally refers to a cryptographic abstraction for "verifiable storage" and which can be implemented, for example, by Reckle trees or Merkle trees.

A recursive SNARK is a SNARK that can call its verification algorithm within its circuit. Some of the SNARKs may be optimized for recursion, e.g., via the use of special curves. The framework disclosed herein may be compatible with any recursive SNARK (e.g., Plonky2).

Reckle tree may work under a fully-dynamic setting for batch proofs: Assume a Reckle batch proof $\pi_I$ for a subset l of memory slots has been computed. Reckle tree can support the following updates to $\pi_I$ in logarithmic time: (a) change the value of element M [i], where i∈I; (b) change the value of element M [j], where j∉I; (c) extend the index set I to I∪w so that M[w] is also part of the batch; (d) remove index w from I so that M[w] is not part of the batch; (e) remove or add an element from the memory altogether. In this case, Reckle tree can rebalance following the same rules of standard data structures such as red-black trees or AVL trees.

In some cases, updating a batch proof $\pi_I$ in Reckle tree is achieved through a batch-specific data structure $\Lambda_I$ that stores recursively-computed SNARKs proofs. Reckle tree can be naturally parallelizable. Assuming enough parallelism, any number of updates T>1 can be performed in O(log n) parallel time. For instance, a massively-parallel Reckle trees implementation can achieve up to 270× speedup over a sequential implementation.

Reckle tree may have particularly low memory requirements: While they can make statements about n leaves, their memory requirements (excluding the underlying linear-size Merkle tree) scale logarithmically with n. Additionally, Reckle trees have the flexibility of not being tied to a specific SNARK: If a faster recursive SNARK implementation is introduced in the future (e.g., folding schemes), Reckle trees can use the faster technology seamlessly.

In some embodiments, the method may comprise: letting I be the set of Merkle leaf indices for which to compute the batch proof, starting from the leaves $l_1, \ldots, l_{|I|}$ that belong to the batch l, Reckle tree run the SNARK recursion on the respective Merkle paths $p_1, \ldots, p_{|I|}$, merging the paths when common ancestors of the leaves in I are encountered. While the paths are being traversed, Reckle trees may verify that the elements in I belong to the Merkle tree as well as compute a "batch" hash for the elements in I, eventually making this batch hash part of the public statement.

In some cases, the batch hash is computed via canonical hashing, a deterministic and secure way to represent any subset of |I| leaves succinctly. It should be noted that any number-theoretic accumulator (or even the elements in the batch themselves) can be utilized. In some cases, the method herein may select canonical hashing to avoid encoding algebraic statements within the circuits. This beneficially ensures the circuits' size not depend on the size and topology of the batch. If the final recursive proof verifies, that means that the batch hash corresponds to a valid subset of elements in the tree, and can be recomputed using the actual claimed batch as an input. The Reckle tree herein may distinguish from the conventional Merkle tree construction that every node v in a Reckle tree, in addition to storing a Merkle hash $C_v$, can also store a recursively-computed SNARK proof $\pi_v$, depending on whether any of v's descendants belongs to the batch I in question or not (For nodes that have no descendants in the batch, there is no need to store a SNARK proof.) The approach or methods herein can be easily extended to unbalanced q-ary Merkle.

Referring back to the verifying SQL queries systems and methods herein, a query decomposition method may be provided.

Example query decomposition. The system may support a simple SQL query using SQL operators from the operators library (e.g., Table 1). As an example, assume a table A that has two attributes x and y and the goal is to return the rows of A such that 105≤y≤250, projected at x and sorted by x. This query can be written in SQL as select x
    from A
    where 105≤y≤250
    orderby x Let $\pi_C$ be the proof for the public statement
    CREATE$_y$(d, A).

Note that $\pi_C$ simply contains A and verifying it just involves recomputing the digest from scratch. It can also have A as a witness, but typically the correctness of the table digest is an orthogonal problem. The method may choose to sort A by y during setup because a range query on y is anticipated later. Then a range search proof $\pi_R$ on d is produced by using the SNARK for the statement
    RANGE$_y$(d, o, 105,250),
outputting an order-agnostic digest o. Next, the method produces the final single proof $\pi_S$ for the statement
    PROJECT-SORT$_x$(o, d').

For this query, it will need to verify two proofs ITR for the statement (d, o, 105, 250) and $\pi_S$ for the statement (o, d'). The digests d, o and d' and the underlying tables can be computed before starting to compute the proofs, and therefore the two proofs can be computed completely in parallel. Such parallelism capability beneficially improves the computational efficiency and reducing the computational time of the verification process. The parallelism for the system (PERSEUS) can be further improved by computing the individual proofs in parallel due to Reckle trees.

Evaluation. The preliminary evaluation on the well-known TPC-H benchmark show that the proof size is approximately 139×(1.25 vs 174.52 MiB) and the updates are around 6.11×(14.56 vs 89.17 seconds) better than the baseline. The unoptimized prover is 4.19× slower than the baseline, which can be improved by implementing optimizations.

Preliminaries

Below are notation and definitions for SNARKs and Merkle Trees. Let $\lambda$ be the security parameter and H: $\{0, 1\}^* \to \{0, 1\}^{2\lambda}$ denote a collision-resistant hash function. Let [n]=[0, n)={0,1, . . . ,n−1}.

Succinct Non-Interactive Arguments of Knowledge [2]. Let $\mathcal{R}$ be an efficiently computable binary relation that consists of pairs of the form (x, w), where x is a statement and w is a witness.

Definition 2.1. A SNARK is a triple of PPT algorithms Π=(Setup, Prove, Verify) defined as follows:

Setup $(1^\lambda, \mathcal{R}) \to$(pk, vk): On input security parameter $\lambda$ and the binary relation R, it outputs a common reference string consisting of the prover key and the verifier key (pk, vk).

Prove (pk, x, w)→$\pi$: On input pk, a statement x and the witness w, it outputs a proof $\pi$.

Verify (vk, x, $\pi$)→1/0: On input vk, a statement x, and a proof $\pi$, it outputs either 1 indicating accepting the statement or 0 for rejecting it.

It also satisfies the following properties:
Completeness: For all (x, w)∈ $\mathcal{R}$, the following holds:

$$Pr\left(\text{Verify}(vk, x, \pi) = 1 \,\middle|\, \begin{array}{l}(pk, vk) \leftarrow \text{Setup}(1^\lambda, \mathcal{R})\\ \pi \leftarrow \text{prove}(pk, x, w)\end{array}\right) = 1$$

Knowledge Soundness: For any PPT adversary $\mathcal{A}$, there exists a PPT extractor $\chi_\mathcal{A}$ such that the following probability is negligible in $\lambda$:

$$Pr\left(\begin{array}{l}\text{Verify}(vk, x, \pi) = 1\\ \wedge \mathcal{R}(x, w) = 0\end{array} \,\middle|\, \begin{array}{l}(pk, vk) \leftarrow \text{Setup}(1^\lambda, \mathcal{R})\\ ((x, \pi); \leftarrow \mathcal{A}\|_{\chi_\mathcal{A}}(pk, vk))\end{array}\right)$$

(The notation (x, $\pi$); w)← $\mathcal{A}\|_{\chi_\mathcal{A}}$ (pk, vk) means the following: After the adversary $\mathcal{A}$ outputs (x, x), it can run the extractor $\chi_\mathcal{A}$ on the adversary's state to output w. If the adversary outputs a verifying proof, then it must know a satisfying witness that can be extracted by looking into the adversary's state.)

Succinctness: For any x and w, the length of the proof $\pi$ is given by |$\pi$|=poly($\lambda$)·polylog (|x|+|w|).

Merkle trees. Let M be a memory of n slots. A Merkle tree is an algorithm to compute a succinct, collision-resistant representation C of M (also called digest) so that one can provide a small proof for the correctness of any memory slot M [i], while at the same time being able to update C in logarithmic time whenever a slot changes. Assume the memory slot values and the output of the H function have size 2$\lambda$ bits each. The Merkle tree on an n-sized memory M can be constructed as follows. The n items will be leaves in a full binary tree of N leaves, where N is the closest power of 2 to n. The Merkle tree will not contain all nodes of the full binary tree but only those that are on the paths from the n leaves to the root, and their siblings. As such, some siblings might have no children, in which case it calls such nodes "external." For every node v in the Merkle tree T, the Merkle hash of v, $C_v$, is computed as in FIG. 3. FIG. 3 shows an example of computing hash $C_v$ as a function of $C_L$ and $C_R$ in the general case when the number of leaves is not a power of two. The digest of the Merkle tree is the Merkle hash of the root node. The proof for a leaf comprises bashes along the path from the leaf to the root. It can be verified by using hashes in the proof to recompute the root digest C.

Canonical hashing. Canonical hashing is an algorithm to compute a digest of some subset I of the leaves of a Merkle tree. Define the canonical hash of a node v of Merkle tree T (with respect to some subset I), denoted d(v, I), recursively as in FIG. 4. FIG. 4 shows an example of computing hash $C_v$ as a function of of $C_L$ and $C_R$ in the general case when the number of leaves is not a power of two.

Order-agnostic canonical hashing. Order-agnostic canonical hashing is the same algorithm with canonical hashing except that the hash function H is replaced with an order-agnostic hash function O. In particular O: $\mathcal{D}^2 \to \mathcal{D}$ is a function that can be used to output a collision resistant hash of a set S={$x_1$ . . . , $x_n$} of elements in $\mathcal{D}$, in the following way: For i=1, . . . , n, set $h_i$=O($h_{i-1}$, $x_i$), where $h_0$ is a fixed constant. Importantly, the output hash does not depend on the order in which the elements of the set are being considered. For the implementation, the system uses the order agnostic hash.

Reckle trees. Reckle trees is a way to compute updatable proofs for Map/Reduce computations in a massively parallel fashion as described elsewhere herein. In particular, let $\mathcal{D}$ and $\mathcal{R}$ denote the domain of the input and output of the computation, respectively. Reckle trees work with the following abstraction, in terms of predicates, for Map/Reduce:

Map: $\mathcal{D} \times \mathcal{R} \to 0/1$;

Reduce: $\mathcal{R} \times \mathcal{R} \times \mathcal{R} \to 0/1$.

In particular, Map is a predicate that takes as input both the input to the MAP computation and the output of the MAP computation and returns 1 if and only if the input and output are consistent. Define the Reduce predicate similarly.

Assume to execute the Map/Reduce computation on a subset $I \subseteq [n]$ of the memory slots which have (d, o) as their canonical hash and order-agnostic hash. With Reckle trees a proof can be computed for the following public statement:

MR(out, C, d, o), out is the output of the Map/Reduce computation on some set of leaves I of a Merkle tree whose Merkle root is C and whose root has (d, o) as canonical hash and order-agnostic canonical hash with respect to I.

In some cases, computing this proof comprises using recursive SNARKs—the circuits in FIG. 5. FIG. 5 shows an example of Map/Reduce circuits for Reckle trees, with vk$_i$ indicating the verification key for circuit M$_i$.

In particular, the first thing that the prover needs to do is to compute the witnesses that are required to run the SNARK proof. To do that, the prover performs the following: 1) The prover computes the tree $T_I$ formed by Merkle proofs $\{\pi_i\}_{i \in I}$. For each node v of $T_I$ it stores the respective value $C_v$ that that can be found in or computed from the proofs $\{\pi_i\}_{i \in I}$; 2) Let now $T_I' \subset T_I$ be the subtree of $T_I$ that contains just the nodes on the paths from I to the root. The prover computes the canonical hash d(v, I) for all nodes $v \in T_I'$ with respect to I as well as the output of the Map/Reduce computation.

After the witness is computed, the method proceeds with computing the recursive SNARK proofs that eventually will output the Map proof. The method first produces the public parameters by running the setup of the SNARK (pk$_i$, vk$_i$) $\leftarrow$ Setup ($1^\lambda$, M$_i$) for the circuit M$_i$, where i=0, ... $\ell$−1. Consider now the set of indices I for which it is calculating the Map/Reduce proof and let $T_I'$ be the subtree as defined above. Let $V_I$ be the nodes of $T_I'$ at level l=1, ... $\ell$. To compute the Map/Reduce proof, it follows the procedure below.

For all levels l=0, ... $\ell$−1, for all nodes $v \in V_I$s

Let L be v's left child and R be v's right child in $T_I$;

Set $$\pi_v = \text{Prove}(pk_i, x_v, (w_L, w_R)), \quad (1)$$

where $$x_v = (C_v, d_v, o_v, \text{out}_v),$$

and $$w_L = (C_L, d_L, o_L, \text{out}_L, \pi_L),$$

and $$w_R = (C_R, d_R, o_R, \text{out}_R, \pi_R).$$

The final Map/Reduce proof for index set I will be $\pi r$, where r is the root of TI.

Verifiable SQL Operators

Systems of the present disclosure implement the verifiable SQL operators from the library (e.g., Table 1) using the Map/Reduce framework. As an example, assume that every row v of the relational tables have two attributes, key(v) and value(v), and assume that they are indexed by key(v). This will be generalized to arbitrary number of attributes and arbitrary indices later.

Verifiable CREATE Operator

The method may compute the digest of a Table T using a Merkle tree. On input a table T, CREATE operator will compute d by prepending index(v) to every row key(v)||value(v) of T. Therefore to provide a proof for the public statement CREATE (d, T), meaning d is the Merkle digest of a table T whose rows are of the type index(v)||key(v)||value(v).

one has to output just T. Note that it can also choose to have T as witness in which case the method may use the Map/Reduce framework. In some cases, the method may not implement Map/Reduce framework when the digest d of the table where the SQL query will be executed is considered to be trusted and that it has been computed correctly.

Verifiable SORT Operator

Let d be the digest of a Merkle tree of an unsorted table (on key(v)) of n rows. Let now d' be the digest of a Merkle tree on the same table T, but sorted on key(v), It will provide a SNARK construction for the following public statement:

SORT (d, d'), d' is the digest of a table that has the same elements with another table represented by digest d, but is rearranged to be sorted by the key of the table.

For example, if d represents the 4-row table index

| index | key | value |
|---|---|---|
| 0 | 3 | 7 |
| 1 | 1 | 15 |
| 2 | 13 | 22 |
| 3 | 5 | 104 | then d' represents the 4-row table index

| index | key | value |
|---|---|---|
| 0 | 1 | 15 |
| 1 | 3 | 7 |
| 2 | 5 | 104 |
| 3 | 13 | 22 |

The proof for the statement SORT (d, d') consists of two proofs, the proof of order for (d', o)—meaning that d' is the digest of an ordered table with order-agnostic hash o, and the proof of completeness for (d, o)—meaning that o is the order-agnostic hash for a table whose digest is d. Clearly, if both proofs verify, it follows that d' is the "sorted" digest of d.

Proof of order. For the proof of order $\pi_o$, let d' be the digest of the sorted table. To check that d' corresponds to a table that is sorted and that it has the appropriate indexing, is to define the MAP and REDUCE functions as follows. For MAP, the input is a leaf element index(v)||key(v)||value(v)

and the output is four values: min=max=key(v) and minInd=maxInd=index(v). REDUCE will take as input eight values (min$_L$, minInd$_L$), (max$_L$,maxInd$_L$), (min$_R$,minInd$_R$), (max$_R$,maxInd$_R$) and will output (min, minInd) and (max, maxInd) if the following tests hold, (1) max$_L \leq$ min$_R$; (2) maxInd$_L$=minInd$_R$−1; (3) max=max$_R$ and maxInd=maxInd$_R$; and (4) min=min$_R$ and minInd=minInd$_R$. So a proof of order is a proof for the statement MR (d', *, o, [(min,minInd),(max,maxind)])
for the MAP and REDUCE functions as described above. It indicated with * the third argument of the MR statement. This is because it is not necessary to consider all the elements in the table so it does not have to compute the canonical hash—just the order agnostic canonical hash is enough.

Proof of completeness. To prove that o is the order-agnostic hash for a table whose digest is d, the method produces a proof for the public statement MR (d, d, o, ⊥). Use ⊥ to indicate that it is not using any MAP-REDUCE function. Importantly the second and third argument must both be equal to d, meaning that the order-agnostic hash o corresponds to the whole table represented by d.

AGNOSTIC-SORT. In case the unsorted table is given as input as an order agnostic hash o, it only needs to perform a proof of completeness. In this case the primitive AGNOSTIC-SORT (o, d') is called.

Verifiable RANGE Operator

Let now d be the digest of a table that is sorted on key(v). The method provides a SNARK construction for the public statement RANGE(d, o, a, b), is the order-agnostic hash of a table that contains all rows with key in [a, b] from a table represented by digest d.

For example if d represents the 4-row table

| index | key | value |
|---|---|---|
| 0 | 1 | 15 |
| 1 | 3 | 7 |
| 2 | 5 | 104 |
| 3 | 13 | 22 | and a=2 and b=7 then o will represent the 2-row table

| key | value |
|---|---|
| 13 | 7 |
| 7 | 104 |

The reason to not include the index column is because the order-agnostic hash does not include index. The method will implement the verifiable RANGE functionality using the MAP-REDUCE framework. In particular, the MAP function applied on a leaf index(v)∥key(v)∥value(v) and on the variables sumOut, sumIn, o, maxInd, minInd returns 1 if
maxInd=minInd=index(v), for some t.
sumIn=1 and sumOut=0 and o=key(v)∥value(v) if key(v) ∈[a, b]
sumIn=0 and sumOut=1 and o=1 if key(v)∉[a, b].
The REDUCE function will take input
$sumIn_L$, $sumOut_L$, $o_L$, $t_L$, $minInd_L$, $maxInd_L$;
$sumIn_R$, $sumOut_R$, $o_R$, $t_R$, $minInd_R$, $maxInd_R$
sumIn, sumOut, o, minInd and maxInd
and outputs 1 iff $sumin=sumin_L+sumin_R$, $sumOut=sumOut_L+sumOut_R$, $o=O(oL, oR)$, $minind=min(minind_L, minind_R)$ and $maxind=max(maxind_L, maxind_R)$.

A proof for RANGE (d, d', a, b) is a proof for the statement
MR (d, *, *, (sumin, sumOut, o, minind, maxind)),
where o is the order-agnostic hash of the range if sumOut=2 (boundary values have been considered) and maxind−minind=sumin+1 (nothing has been omitted that lies within the boundary values) and mini nd=−1

(the indices have been adjusted). To finally get to d', it produces an additional proof for AGNOSTIC-SORT (o, d').

JOIN-RANGE. JOIN-RANGE (d, o, a, b, val) is the same with RANGE with the only difference that it takes as input an additional argument (val) and appends this value to the final output. In particular, for the previous example is it set val=37 the output table will be

| key | value |
|---|---|
| 3 | 37∥7 |
| 5 | 37∥104 |

Note it is easy to adjust RANGE to JOIN-RANGE. All needs to do is pass the value val in the MAP function and make it part of the public statement, while at the same time checking that all leaves used the same value val.

Figure 6:
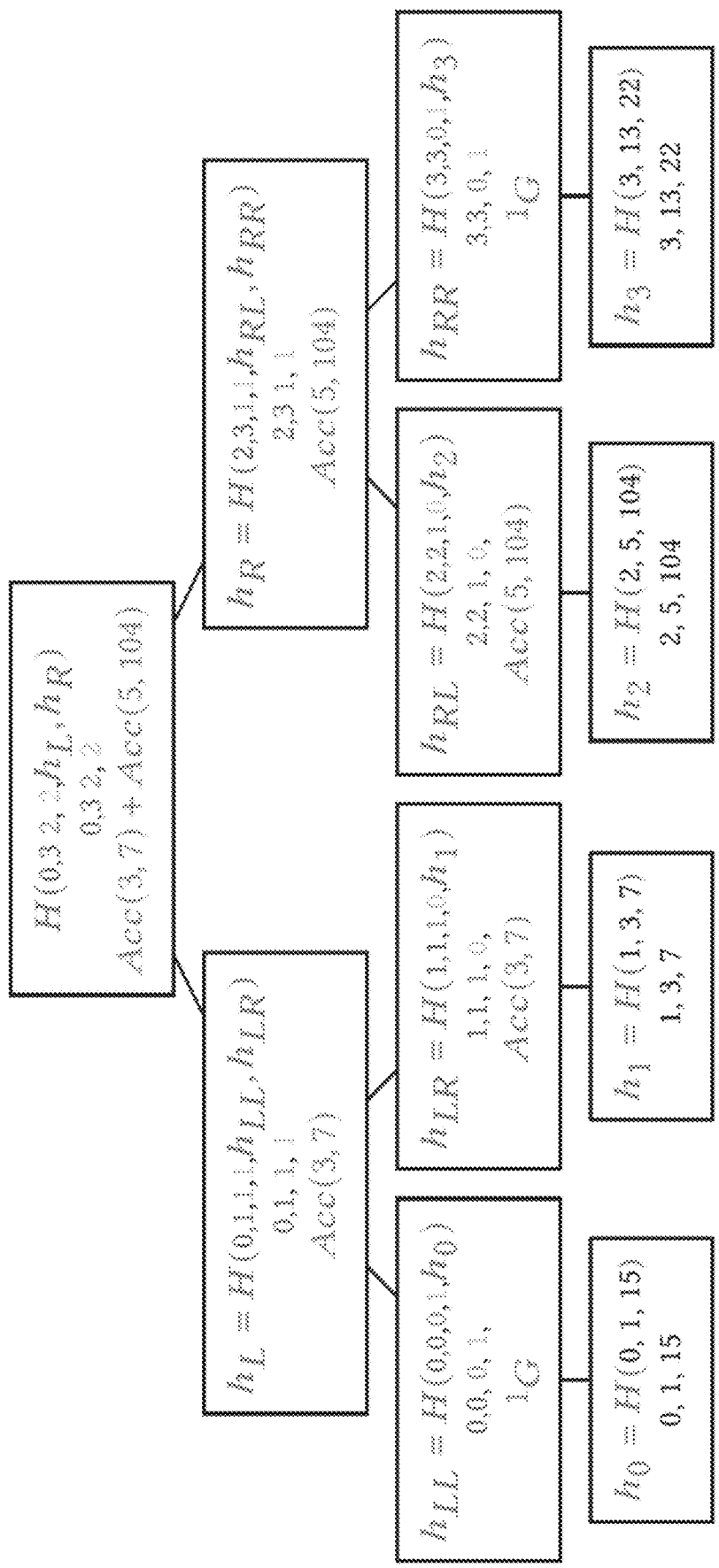
FIG. 6 shows an example of merklization of the example table for Verifiable RANGE, with the data for each subtree stored in each internal node.

FIG. 6 shows an example of merklization of the example table for Verifiable RANGE, with the data for each subtree stored in each internal node. Each subtree tracks its maximum and minimum, the count of elements in the range, the count of elements not in the range, and the order agnostic hash of rows whose key is in the range Additionally, each node stores a recursive SNARK proof that it was correctly constructed and that the proofs in the child nodes are correct.

Verifiable EQUIJOIN Operator

Let d be the Merkle digest of a table T and d' be the Merkle digest of a table T'. Let also D the Merkle digest of the EQUIJOIN of the tables represented by d and d'. Construct a SNARK for the public statement EQUIJOIN (d, d', o).

D is the is the digest of the table representing the EQUIJOIN of the tables represented by Merkle digests d and d'.

For example, if d represents the table

| Index | key | value |
|---|---|---|
| 0 | 1 | 15 |
| 1 | 3 | 7 |
| 2 | 5 | 104 |
| 3 | 13 | 22 | and d' represents the table

| Index | key | value |
|---|---|---|
| 0 | 1 | 22 |
| 1 | 1 | 71 |
| 2 | 5 | 11 |
| 3 | 5 | 57 |

D should represent the table

| Index | key | value |
|---|---|---|
| 0 | 1 | 15∥23 |
| 1 | 1 | 15∥71 |
| 2 | 5 | 104∥11 |
| 3 | 5 | 104∥57 |

It will produce an EQUIJOIN proof in two steps. In the first step, it will produce an order-agnostic hash of the rows in the EQUIJOIN, i.e., an order-agnostic hash of the elements (1, 15∥23), (1, 15∥71), (5, 104∥71), (5, 104∥57).

Then it will use AGNOSTIC-SORT to map the above order-agnostic hash to a Merkle digest representing the table above.

Therefore the rest of this section will focus on how to produce the order-agnostic hash of the elements in the EQUIJOIN. The method uses the MAP-REDUCE framework on the first table (represented by d) as follows. The MAP function on leaf v takes as input index(v)∥k=key(v)∥v=value(v)
A proof lrk for the public statement
JOIN-RANGE (d', o, k, k, v),
and output 1 iff the proof lrk verifies and the arguments in JOIN-RANGE are consistent with k and v of the node in question. As for the REDUCE function, it takes as input the order agnostic hashes $o_L$ and $o_R$ as well as the digests of the second table $d'_L$ and $d'_R$ and outputs o and $d'^{ut}_o$ and checks whether $o=o_L=o_R$ and $d'_L=d'_R=do^{ut}=d'$. Note that d' is a constant, the Merkle digest of the second table. The reason to output d' in the REDUCE function is to ensure that every leaf node is running JOIN-RANGE on the same table d.

In the end, the public statement it provides a proof for is

MR (d, d, *, (o, d')).

Note that the first two arguments of the MR statement above must be equal to d, indicating that it runs the MAP function on every single leaf of the first table, as is required in order to have a complete JOIN.

Reducing the number of JOIN-RANGE proofs. In the above construction of EQUIJOIN, it is required to compute a JOIN-RANGE proof for all leafs of the first table that is joining. However, in some cases most of the leaves are not contained in the second table and therefore no rows would be contributed to the result of the EQUIJOIN by considering those leaves. The goal here is to minimize the number of JOIN-RANGE proofs to compute. For example, imagine the first table is has the following keys on the JOIN attribute (1, 2, 3, 4, 5, 6, 7, 8, 9)
while the second table has the following keys on the join attribute
(1, 1, 1, 1, 1, 9, 9, 9, 9, 9)

Instead of doing 9 JOIN-RANGE proofs, it can do just 3. One for 1, one for the interval [2,8] (which will return an empty set) and one for 9.

Verifiable GROUPBYAGG

Let d be the digest of the input table and and let o be the order agnostic hash of the table produced by running GROUPBY with aggregate function f. For example, if d is the digest of the table

| Index | key | value |
|---|---|---|
| 0 | 1 | 15 |
| 1 | 1 | 7 |
| 2 | 5 | 104 |
| 3 | 5 | 22 | and the aggregate function is sum then o should be the order-agnostic hash of the table

| key | value |
|---|---|
| 1 | 22 |
| 5 | 126 |

Figure 7:
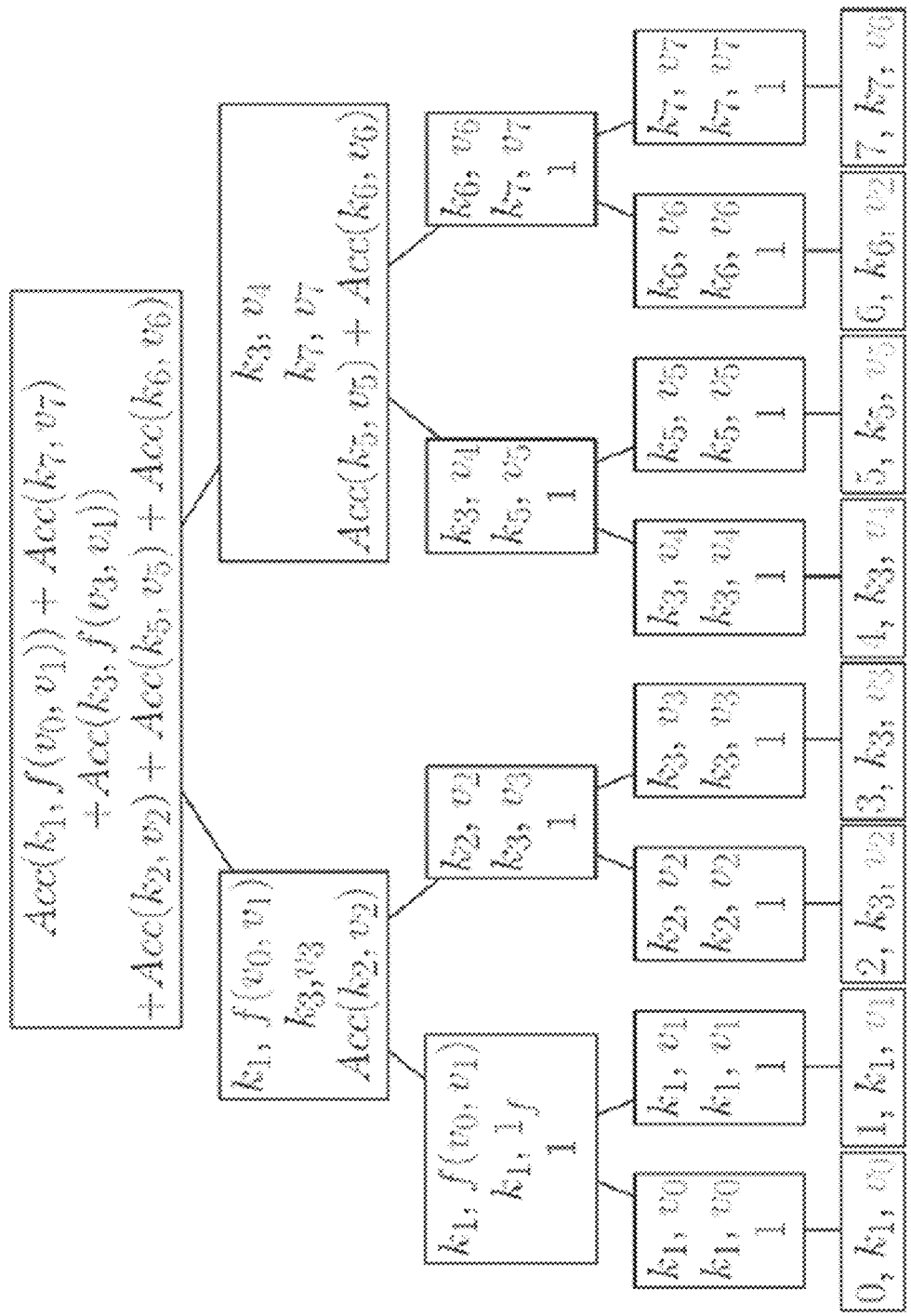
FIG. 7 shows an example of the GROUPBY protocol as a MAP-REDUCE computation.

The method shows how to build a SNARK for the public statement GROUPBYAGG(d, o). FIG. 7 shows an example of the GROUPBY protocol as a MAP-REDUCE computation. Internal nodes track the leftmost key in the subtree, aggregate of values in the subtree for that key, the rightmost key and its aggregate in the subtree, and an order-agnostic hash of the key, aggregate pairs for keys strictly between the left and rightmost keys.

Again, using the MAP-REDUCE framework as follows: Since the table is sorted, every node v of the tree covers a leaf region that can be divided in three areas: The left area contains keys that might spread to other subtrees to the left of v. The right area contains keys that might spread to other subtrees to the right of v. The middle area contains all keys that cannot exist in other subtrees and that can be safely accumulated as part of the final result. The method makes sure that every node of the tree must keep track of at most three values: The left running aggregate LA, the right running aggregate RA and the running accumulation of aggregates ACC. Below shows the MAP function in detail. The MAP function will take as input index (v)∥key(v)∥value (v) as well as:

($k_{la}$, LA), the left aggregate;
($k_{ra}$, RA), the right aggregate;
ACC, the accumulation of aggregates.
and will output 1 iff LA=RA=value(v), kla=kra=key(v) an ACC=1

The REDUCE function will work as follows. It merges two inputs.

($k_{la}^{(L)}$ $LA_L$, $k_{ra}^{(L)}$ $RA_L$, $ACC_L$
($k_{la}^{(R)}$ $LA_R$, $k_{ra}^{(R)}$ $RA_R$, $ACC_R$
into one, ($K_{la}$,LA), ($K_{ra}$,RA), ACC according to the following cases:

If $k_{la}^{(L)}=k_{la}^{(R)}$ it checks that $ACC=ACC_L*ACC_R$ and that $k_{la}=k_{ra}=k$ and that $LA=RA=f(LA_L, LA_R, RA_L, RA_R)$.

If $k_{la}^{(L)}<k_{la}^{(R)}$ raand neither $k_{la}^{(R)}$ nor $k_{la}^{(L)}$ lie strictly between them, merge pairs with the same key to a single (key, Agg) pair with the aggregate being the application of the function f to the respective values. In this case, there will be two such pairs and then it checks that $ACC=ACC_L*ACC_R$ and it checks that kla=$k_{la}^{(L)}$, $k_{ra}=k_{la}^{(R)}$ and that $L_A=AGG_L$ (the aggregate with key $k_{la}$) and $RA=AGG_R$ (the aggregate with key $k_{ra}$).

If $k_{la}^{(L)}<k_{la}^{(R)}$ and $k_{la}^{(R)}$ or $k_{la}^{(R)}$ alie strictly between them, merge pairs with matching keys. In the case of one "interior" (key, Agg) pair, set ACCC=0 (key, Agg); in the case of two pairs, set ACCC=0 ($key_{C1}$, $Agg_{C1}$)*0 ($key_{C2}$, $Agg_{C2}$). Then check that $ACC=ACC_L*ACC_R*ACCC$ and it checks that $k_{la}=k_{la}^{(L)}$, $k_{ra}=k_{la}^{(R)}$ raand that $LA=AGG_L$ and $RA=AGG_R$.

Verifiable SELECT Operator

One of the most important primitives is selection. In particular the public statement to prove is parameterized by the digest of the input table d, the order-agnostic hash of the output table o, and the predicate that apply to all leaves of the table, expressed with a function pred—i.e., SELECT(d, o, pred). To build a SNARK for selection the method uses the Map/Reduce framework. For the MAP predicate, out is either x (the value passes the filter) or the default value 1. The REDUCE function will just multiply the results that it receives from the children nodes and will also ensure that the canonical hash matches the Merkle hash, i.e., that all nodes have been considered.

Extending to Multiple Attributes

The method and system herein may extend the verifiable SQL operators to multiple attributes. For instance, the method may view key(v)∥value(v) just as row(v) which is a bitstring of k·m bits, where m is the fixed number of bits used to represent each attribute, and k is the number of attributes. Under this new definition the digest d output by CREATE(d, T) (where T is a table of n rows) will contain the information (n, k, m, att, ind) as "metadata," where att is a list of attributes of the form:

(1, $att_1$), (2, $att_2$), . . . (k, $att_k$)

and $att_i$ are strings describing the name of each attribute, such as "employeeName" or "orders." Note that each attribute is represented by an integer in [1, k]. Without loss of generality, assume that this integer is the same across tables. In implementation, two integers are provided, when for example, to join two tables on the same attribute. Finally, note that the final piece of metadata is ind, which indicates whether the table is indexed on attribute ind. If not, then ind is set to null. Rewrite the public statement that it can prove for multiple attributes.

$CREATE_x$ (d, 7), where d contains as metadata (n, m, k, att, ind), as defined above. Use x to indicate an attribute for the table that is used as index during creation (i.e., the rows of the table will be sorted based on x).

$SELECT_x$ (d, o, func), where x is the attribute of d on which the selection is performed.

$SORT_x$ (d, d'), where x is the attribute of d's att on which the sorting is performed. Note that the in d metadata field of d' must be set to x.

AGNOSTIC-$SORT_x$ (o, d'). Same as above. Note that agnostic sort digest o also contains metadata, but the in d field is by definition null.

$RANGE_x$ (d, o, l, r), where x is the attribute on which the range is performed. Note d should have the in d argument set to x, i.e., it has to be sorted.

JOIN-$RANGE_x$ (d, o, l, r, val), as above with the difference that o's attribute list will be updated to contain the attributes that val contains.

$EQUIJOIN_x$ (d, d', o), where x is the attribute where the JOIN is computed on. Note that the metadata of o are updated to include a concatenation of d's and d''s attributes, with the difference that attribute x is copied only once.

$GROUPBYAGG_{x,y}$ (d, o, func), where x is the attribute on which it performs the groupby and y is the attribute it applies the function on. Note that d must be sorted.

Verifiable PROJECT Operator

Let d be the digest of the table to compute a project on. To prove the public statement PROJECT, (d, o), where x is a list of attributes that is to keep, it is to see how the MAP-REDUCE framework can be used to implement project. For the MAP function, it will just include the arguments that indicated by the attribute list, and the REDUCE function will perform a simple multiplication, as shown in SELECT.

Verifiable ADD Operator

Let d be the digest of the table add an attribute x. Again, it can perform as simple MAP-REDUCE computation and produce a SNARK proof for the public statement $ADD_x$ (d, d'). Without loss of generality it can assume that the value of the new attribute x is set to a default predetermined value.

Query Decomposition from Verifiable SQL Operators

It shows precisely how to produce proof for the query Q4 derived from the TPC-H benchmark. FIG. 8 shows query Q4 from the TPC-H benchmark. FIG. 9 shows query Q5 from the TPC-H benchmark. As shown below, in query Q4 there are exactly two tables involved, lineitem and orders. Let lin and ord be the digests created for these tables respectively, by calling $CREATE_{orderdate}$(ord, orders)

and $CREATE_{orderkey}$(lin, lineitem).

The first thing to do is to run a range search on ord by calling $RANGE_{orderdate}$(ord, $o_1$, [DATE], [DATE]+3).

Then it does a selection query on lin by calling $SELECT_{commitdate,receiptdate}$(lin, $o_2$, <), where < indicates the predicate is "less than." At this point it has produced verifiable digest o1 that contains a subset of rows from orders such that the attribute orderdate falls within a certain range and a verifiable digest of $o_2$ that contains a subset of rows from lineitem such that commitdate is less than receiptdate. It produces a lifted Merkle digest $d_1$ for $o_1$, via LIFT($o_1$, $d_1$)

and a sorted Merkle digest $d_2$ for $o_2$, via

SORT-$AGNOSTIC_{orderkey}$($o_2$, $d_2$)

Due to the existence of the SQL exists operator, it needs to further filter the rows of d1 and keep only those whose orderkey appears at least once in the orderkey of $d_2$. To do this final filtering it can run the select operation $SELECT_{orderdate}$($d_1$, $o_3$, $\in d_2$), where $\in d_2$ is the predicate "belongs in $d_2$." To implement this predicate, it provides a range proof for the value of the respective orderdate attribute of $d_1$ in $d_2$ and the predicate checks whether the output order-agnostic hash is 1 (i.e., empty range) or not (in which case the row is kept). In particular for every orderdate value v it produces a proof for the statement $RANGE_{orderdate}$($d_2$, $o_4$, v, v)

and the produced proof is being given as input to the $\in d_2$ predicate. At this point $o_4$ is an order-agnostic hash of those rows of orders satisfying all predicates of Q4. The final step is to do a group-by. For that it produces an ordered version $d_4$ of $o_4$ by orderpriority by running SORT-$AGNOSTIC_{orderpriority}$($o_4$, $d_4$).

Then it adds a "count" column by running $ADD_{count}$($d_4$, $d_5$)

and finally it performs a "groupby" by running $GROUPBYAGG_{orderpriority,count}$($d_5$, O, sumcount), where sumcount just counts the number of summands. Finally, it does a project on orderpriority and count by doing a

LIFT(O, D)

and then doing a $PROJECT_{orderpriority,count}$(D, F)

All in all, verifying this query requires the computation of 10 proofs. Note that all of these proofs can be done in parallel. First it shows that 6 tables are involved in this query and a digest is created for each one.

$CREATE_{orderkey}$(ord_ok, orders)

$CREATE_{suppkey}$(lin_sk,lineitem)

$CREATE_{nationkey}$(cus_nk, customer)

$CREATE_{nationkey}$(sup_nk, supplier)

$CREATE_{regionkey}$(nat_rk, nation)

$CREATE_{regionkey}$(reg_rk, region)

Two tables can be reduced in size by selections: apply the user's choice of region to the reg_rk table and do a range search on ord_ok using the user's choice of date.

$SELECT_{name '[REGION]'}$(reg_rk, reg_rk_choice)

$RANGE_{orderdate}$(ord_ck, ord_ck_rng, '[DATE]', '[DATE]'+365)

Now it can prepare for the joins. Each table is used in more than one join so it will need to create auxiliary digests for some tables which have been sorted by some other attribute. The first join it will do is to get the nations that are in the user's choice of region.

EQUIJOIN$_{regionkey}$(nat_rk, reg_rk_choice, d0)
Then it sorts this table by nationkey.
SORT$_{nationkey}$(d0, d1)
Then join the suppliers table and then the customer table on nationkey:
EQUIJOIN$_{nationkey}$(sup_nk, d1, d2)
EQUIJOIN$_{nationkey}$(cus_nk, d2, d3)
Now sort on suppkey so it can join the lineitem table.
SORT$_{suppkey}$(d3, d4)
EQUIJOIN$_{suppkey}$(lin_sk, d4, d5)
Sort and join again, this time joining the order table on orderkey.
SORT$_{orderkey}$(d5, d6)
EQUIJOIN$_{orderkey}$(ord_ok, d6, d7)
One more round of sorting and joining provides the full table that are aggregating over. Because the six joins in the query form a cycle it creates a copy of the table that completes the cycle and project away all of its attributes except the one it joins over. This prevents duplicate attributes in the resulting table.
CREATE$_{custkey}$(cus_ck, customer)
PROJECT$_{custkey}$(cus_only_ck, cus_ck)
SORT$_{custkey}$(d7, d8)
EQUIJOIN$_{custkey}$(cus_only_ck, d8, d9)
Now that the full table has been generated it performs the aggregate sum. First it adds a column to hold the revenue, then populates it with a GROUPBYAGG. The function sumrevenue computes revenue as extendedprice*(1−discount) and sums the results.
ADD$_{revenue}$(d9, d10)
GROUPBYAGG$_{name,revenue}$(d10, d11, sumrevenue)
Project away attributes no longer needed:
PROJECT$_{name,revenue}$(d11, d12)
Finally sort by revenue:
SORTrevenue(d12, res, >).
Evaluation The results of preliminary estimates of Perseus on query Q3 from TPC-H benchmarks are shown and compare it with ZKSQL, the only verifiable DB protocol with publicly available source code.

Set the database size to contain 60k rows in the lineitem table, corresponding to a scaling factor of 0.01 as defined in the TPC-H specifications. In the experiments, it devices the following query execution plan for the query Q3 from TPC-H (see FIG. 10). FIG. 10 shows query Q3 from the TPC-H benchmark:

Select the subset of rows from customer, orders, and lineitems using SELECT operator by applying respective predicates.

Join the tables customers and orders using the EQUIJOIN operator, say the resultant table is denoted as customers_orders. Recall that EQUIJOIN requires the proof of JOIN-RANGE for each leaf in customer table.

Sort the results of customers_orders based on the attribute o_orderkey.

Similar to step 2, join the tables customers_orders and orders using the EQUIJOIN operator, say the resultant table is denoted as customers_orders_lineitem.

Apply the GROUPBY operator on customers_orders_lineitem.

Note that the proof computation in each step of Q3 does not depend on the proofs from another step of the query plan. Thus, all the steps in Perseus can be executed concurrently.

Experimental setup. The experiment used AWS c7i.8xlarge EC2 instances (32vCPU, 64 GiB memory) in all the experiments, including the baseline. To compute the execution times of the baseline approach, it used the artifacts provided with ZKSQL. Use Plonky2 proof system and write all our circuits in Rust. Let both the implementation and the baseline to use all the available parallelism provided by the framework.

The experiments set the scaling factor, which is a parameter in TPC-H deter-mining the database sizes, to 0.01. Thus, the table customer contains 1500 rows, order contains 15,000 rows, and lineitem contains 60,175 rows. In Perseus, it padded the tables to next power of two with default values. The choice of parameters such as '[SEGMENT]' and '[DATE]', to run Q3 is identical to the choice of parameters in the baseline.

Implementation. The construction is amenable to distributed proving. Thus, the implementation uses the distributed systems architecture as described above for all the experiments. Moreover, in the experiments, it used a cluster of 200 machines.

The experiments implemented the circuit of JOIN-RANGE operator in Plonky2. However, it reused the circuits from Reckle trees to simulate the cost of other operators used in Q3 (FIG. 10). For instance, to simulate verifiable EQUIJOIN circuit, it just needed to add the cost of combining the results of two reduce operations to the circuits from Reckle trees.

Results. The findings regarding the performance of Perseus on Q3 are as follows:

Proof size. The total proof size is around 1.25 MiB without any proof aggregation technique to combine individual operator proofs. However, proof size in the baseline approach is 174.52 MIB. Thus representing an improvement of up to 139× than the baseline.

Update time. ZKSQL requires recomputing all proofs whenever the underlying data changes. Thus it requires 89.17 seconds. The efficient tree structure of our database allows us to update a proof on a single update in 14.56 seconds. This represents a speed of 6.11× than the baseline.

Prover time. The proving time is estimated to be 373.2 seconds. However, the baseline approach takes 89.17 seconds. This slowdown is a one-time cost as our prover can exploit fast updates whenever the underlying data changes rather than recomputing the proof from scratch.

While preferred embodiments of the present subject matter have been shown and described herein, it will be obvious to those skilled in the art that such embodiments are provided by way of example only. Numerous variations, changes, and substitutions will now occur to those skilled in the art without departing from the present subject matter. It should be understood that various alternatives to the embodiments of the present subject matter described herein may be employed in practicing the present subject matter.

What is claimed is:

1. A computer-implemented method for cryptographically verifying SQL queries, the method comprising:
a) computing a succinct digest for a table stored in a database;
b) receiving a query in structured query language (SQL) for querying data in the table;
c) decomposing the query into one or more basic queries, wherein each of the one or more basic queries comprises a verifiable SQL operator from a library of verifiable SQL operators, and wherein the verifiable SQL operator is a Succinct Non-interactive Argument of Knowledge (SNARK) proof for a statement involving a succinct digest of a table;
d) computing one proof per basic query in parallel and in a distributed fashion; and e) verifying the query by verifying the previously computed proofs in parallel, and checking for consistency of their public statements, according to the previously executed query decomposition.

2. The method of claim 1, wherein the succinct digest of the table is collision resistant representation of the table.

3. The method of claim 2, wherein the succinct digest of the table is computed using a Merkle tree.

4. The method of claim 2, wherein the succinct digest of the table is computed using an order-agnostic hash function.

5. The method of claim 2, wherein the succinct digest encodes metadata related to an attribute name of the table or an indexing of the table.

6. The method of claim 1, wherein the table is a relational table and the database is a relational database.

7. The method of claim 1, wherein verifying the query comprises verifying, for each basic query, an input and output to the statement is consistent.

8. The method of claim 1, wherein a size of a proof for verifying the query is dependent on a number of the one or more basic queries.

9. The method of claim 1, wherein a size of a proof for verifying the query is not dependent on a size of the table.

10. The method of claim 1, wherein computing and verifying the one or more proofs for the one or more basic queries comprises using Map/Reduce circuits for Reckle trees.

11. A computer-implemented system comprising at least one processor and instructions executable by the at least one processor to cause the at least one processor to perform a method for cryptographically verifying SQL queries by performing operations comprising:
   a) computing a succinct digest for a table stored in a database;
   b) receiving a query in structured query language (SQL) for querying data in the table;
   c) decomposing the query into one or more basic queries, wherein each of the one or more basic queries comprises a verifiable SQL operator from a library of verifiable SQL operators, and wherein the verifiable SQL operator is a Succinct Non-interactive Argument of Knowledge (SNARK) proof for a statement involving a succinct digest of a table;
   d) computing one proof per basic query in parallel and in a distributed fashion; and
   e) verifying the query by verifying the previously computed proofs in parallel, and checking for consistency of their public statements, according to the previously executed query decomposition.

12. The system of claim 11, wherein the succinct digest of the table is collision resistant representation of the table.

13. The system of claim 12, wherein the succinct digest of the table is computed using a Merkle tree.

14. The system of claim 12, wherein the succinct digest of the table is computed using an order-agnostic hash function.

15. The system of claim 12, wherein the succinct digest encodes metadata related to an attribute name of the table or an indexing of the table.

16. The system of claim 11, wherein the table is a relational table and the database is a relational database.

17. The system of claim 11, wherein verifying the query comprises verifying, for each basic query, an input and output to the statement is consistent.

18. The system of claim 11, wherein a size of a proof for verifying the query is dependent on a number of the one or more basic queries.

19. The system of claim 11, wherein a size of a proof for verifying the query is not dependent on a size of the table.

20. The system of claim 11, wherein computing and verifying the one or more proofs for the one or more basic queries comprises using Map/Reduce circuits for Reckle trees.

21. One or more non-transitory computer-readable storage media encoded with instructions executable by one or more processors to provide an application for cryptographically verifying SQL queries, the application comprising:
   a) a software module computing a succinct digest for a table stored in a database;
   b) a software module receiving a query in structured query language (SQL) for querying data in the table;
   c) a software module decomposing the query into one or more basic queries, wherein each of the one or more basic queries comprises a verifiable SQL operator from a library of verifiable SQL operators, and wherein the verifiable SQL operator is a Succinct Non-interactive Argument of Knowledge (SNARK) proof for a statement involving a succinct digest of a table;
   d) a software module computing, in parallel and in a distributed fashion, one proof per basic query; and
   e) a software module verifying the query by:
      i) verifying the previously computed proofs in parallel, and
      ii) checking for consistency of public statements, according to the previously executed query decomposition.

22. A computer-implemented method for cryptographically verifying SQL queries, the method comprising:
   a) computing a succinct digest for a table stored in a database;
   b) receiving a query in structured query language (SQL) for querying data in the table;
   c) decomposing the query into one or more basic queries;
   d) computing one proof per basic query in parallel and in a distributed fashion; and
   e) verifying the query by verifying the previously computed proofs in parallel, and checking for consistency of their public statements, according to the previously executed query decomposition;
      wherein a size of a proof for verifying the query is not dependent on a size of the table.

23. The method of claim 22, wherein the succinct digest of the table is collision resistant representation of the table.

24. The method of claim 23, wherein the succinct digest of the table is computed using a Merkle tree.

25. The method of claim 23, wherein the succinct digest of the table is computed using an order-agnostic hash function.

26. The method of claim 23, wherein the succinct digest encodes metadata related to an attribute name of the table or an indexing of the table.

27. The method of claim 22, wherein the table is a relational table and the database is a relational database.

28. The method of claim 27, wherein verifying the query comprises verifying, for each basic query, an input and output to the statement is consistent.

29. The method of claim 22, wherein a size of a proof for verifying the query is dependent on a number of the one or more basic queries.

30. The method of claim 22, wherein computing and verifying the one or more proofs for the one or more basic queries comprises using Map/Reduce circuits for Reckle trees.

31. A computer-implemented system comprising at least one processor and instructions executable by the at least one processor to cause the at least one processor to perform a method for cryptographically verifying SQL queries by performing operations comprising:
   a) computing a succinct digest for a table stored in a database:
   b) receiving a query in structured query language (SQL) for querying data in the table;
   c) decomposing the query into one or more basic queries;
   d) computing one proof per basic query in parallel and in a distributed fashion; and
   e) verifying the query by verifying the previously computed proofs in parallel, and checking for consistency of their public statements, according to the previously executed query decomposition;
      wherein a size of a proof for verifying the query is not dependent on a size of the table.

32. The system of claim 31, wherein the succinct digest of the table is collision resistant representation of the table.

33. The system of claim 32, wherein the succinct digest of the table is computed using a Merkle tree.

34. The system of claim 32, wherein the succinct digest of the table is computed using an order-agnostic hash function.

35. The system of claim 32, wherein the succinct digest encodes metadata related to an attribute name of the table or an indexing of the table.

36. The system of claim 31, wherein the table is a relational table and the database is a relational database.

37. The system of claim 36, wherein verifying the query comprises verifying, for each basic query, an input and output to the statement is consistent.

38. The system of claim 31, wherein a size of a proof for verifying the query is dependent on a number of the one or more basic queries.

39. The system of claim 31, wherein computing and verifying the one or more proofs for the one or more basic queries comprises using Map/Reduce circuits for Reckle trees.

40. One or more non-transitory computer-readable storage media encoded with instructions executable by one or more processors to provide an application for cryptographically verifying SQL queries, the application comprising:
   a) a software module computing a succinct digest for a table stored in a database;
   b) a software module receiving a query in structured query language (SQL) for querying data in the table;
   c) a software module decomposing the query into one or more basic queries;
   d) a software module computing, in parallel and in a distributed fashion, one proof per basic query; and
   e) a software module verifying the query by:
      i) verifying the previously computed proofs in parallel, and
      ii) checking for consistency of public statements, according to the previously executed query decomposition;
      wherein a size of a proof for verifying the query is not dependent on a size of the table.

* * * * *